(12) United States Patent
Taniguchi

(10) Patent No.: US 6,456,356 B1
(45) Date of Patent: Sep. 24, 2002

(54) OPPOSITE LAYOUT SUBSTRATE ALIGNMENT METHOD AND DEVICE AND LIQUID CRYSTAL DISPLAY

(75) Inventor: Kouichi Taniguchi, Kagoshima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/584,197

(22) Filed: May 31, 2000

(30) Foreign Application Priority Data

Jun. 1, 1999 (JP) ............................................ 11-153954

(51) Int. Cl.[7] ............................................. G02F 1/1333
(52) U.S. Cl. ....................................................... 349/158
(58) Field of Search ................................. 349/158, 160, 349/161

(56) References Cited

U.S. PATENT DOCUMENTS 5,556,797 A * 9/1996 Chi et al. .................... 437/405
6,271,602 B1 * 8/2001 Ackmann et al. ........... 257/797

FOREIGN PATENT DOCUMENTS

EP  1 058 146 A2 * 6/2000

* cited by examiner

Primary Examiner—William L. Sikes
Assistant Examiner—Dung Nguyen
(74) Attorney, Agent, or Firm—Sonnenschein Nath & Rosenthal

(57) ABSTRACT

There is provided an alignment method of an opposing layout substrate and a device for surely preventing that the internal surface of the substrates (alignment film) is damaged even when the spacer provided between the substrates has a kind of grain size. In the alignment method of opposing layout substrate which performs alignment of two substrates under the condition that the particle material is provided between two substrates provided opposed with each other, the alignment is performed under the condition that a recessed area is formed to at least one opposing surface of two substrates.

9 Claims, 6 Drawing Sheets

OPPOSITE LAYOUT SUBSTRATE ALIGNMENT METHOD AND DEVICE AND LIQUID CRYSTAL DISPLAY

BACKGROUND OF THE INVENTION

1. Field of the Invention

The present invention relates to an opposite layout substrate alignment method and device and a liquid crystal display and particularly to an opposite layout substrate alignment method and device just suitable for manufacture of a TFT system liquid crystal display and an LCD manufactured using the same method.

2. Description of the Related Art

In a well known liquid crystal display (LCD) apparatus, characters and images are displayed by transmitting and reflecting the light beam through changes of molecular alignment generated when a voltage is applied across the liquid crystal filled between two glass plates. As a kind of such liquid crystal display, there is proposed a liquid crystal display of a thin film transistor (TFT) system. This TFT system liquid crystal display is preferable in the viewpoints of contrast, gradation display and response rate because each pixel of a display area is controlled by a thin film transistor, and thereby display flicker is reduced.

Here, a method of manufacturing existing liquid crystal display and an apparatus manufactured will be explained with reference to the drawings. FIG. 4 illustrates a process flow of manufacturing an LCD, FIG. 5 illustrates a detail flow of an alignment process in the process flow of FIG. 4, and FIGS. 6A and 6B illustrate stages of an existing aligning apparatus. FIG. 6A is a plan view, while FIG. 6B is a cross-sectional view. FIG. 7 is a cross-sectional view illustrating when a substrate is set in the existing stage. FIGS. 8A and 8B illustrate alignment in the existing stages. FIG. 8A is a cross-sectional view and FIG. 8B is an enlarged view.

As illustrated in FIG. 4, in the process flow of manufacturing an LCD, cleaning, coating of alignment film, rubbing (single alignment process of molecule), cleaning, spraying of spacer (transparent glass, resin or the like) are previously performed to the TFT substrate. Moreover, cleaning, coating of alignment film, rubbing, cleaning, coating of sealing agent are previously performed to an opposite layout substrate. The TFT substrate and opposite layout substrate having completed the above processes are aligned and liquid crystal is then supplied to the space between these substrates.

Details of such alignment process are as follows. First, the TFT substrate on which spacer is coated and an opposite layout substrate on which a sealing agent consisting, for example, of UV hardening type epoxy resin are prepared (step S50). Next, temporary alignment of the TFT substrate and opposite layout substrate is once performed (step S51) and thereafter the alignment operation (positioning of TFT pixels and RGB pixels) is performed (step S52) by respectively moving the substrates under the temporary aligned condition in the directions of X, Y and θ within the range of the predetermined allowance. Thereafter, the press work is then conducted to press the sealing agent up to the predetermined gap (step S53) and the sealing agent is then hardened through the heat treatment or UV radiation (step S54). Thereby the alignment process is completed.

For performing the alignment shown in the step S52, a stage 100 of the alignment apparatus illustrated in FIGS. 6A and 6B is used. In the stage 100, the groove 101a for vacuum-holding a substrate is formed in the shape of a letter H at the upper surface of a flat block 101, a vacuum-holding hole 101b is bored toward the bottom surface from the center of the letter H, and this vacuum-holding hole 101b is bent in the horizontal direction and is then connected to a vacuum pipe not illustrated.

On this stage 100, when a substrate 110 is placed as illustrated in FIG. 7, the substrate 110 becomes flat depending on the surface of stage.

Therefore, at the time of starting the alignment operation, the temporarily aligned LCD 150 is held between the stage 120 in the TFT substrate side and the stage 130 in the opposite layout substrate side as illustrated in FIGS. 8A and 8B. Under this condition, the TFT substrate 15 and opposite layout substrate 152 are respectively fixed to the stages 120, 130 by the vacuum sticking. When the alignment operation is performed in the X, Y and θ directions in such fixing condition, the alignment film coated on the substrate surfaces may be sometimes damaged by the spacer 161. Numeral 162 designates the sealing agent.

When the TFT system liquid crystal display, for example, is manufactured using the manufacturing apparatus of the related art explained above, there arise the following problems.

① As display density of display area is further improved, size of one TFT pixel is further reduced and thereby a fault in size which has been neglected in the related art will be considered as a serious matter.

② As explained above, spacer is sprayed to keep uniform gap between both TFT substrate and opposite layout substrate, this spacer will damage the alignment film at the time of alignment operation and such damage will progress as a fault in some cases. In view of avoiding damage of alignment film due to this spacer, following methods have been introduced. Namely, the spacer having a grain size larger than that of the spacer for gap control is mixed to the sealing area in order to prevent damage during the alignment and the press work is performed until the normal gap can be attained after the end of alignment.

However, in the means for avoiding damage on the alignment film by the related art, two kinds of spacers having small and large grain sizes are required. Moreover, the process for previously mixing the spacer having larger gain size into the sealing agent has been required.

SUMMARY OF THE INVENTION

It is therefore an object of the present invention to provide an opposite layout substrate alignment method and device which surely prevents damage on the inside of a substrate (alignment film) even when the spacer provided between the substrate has only one kind of grain size and an LCD manufactured by the same method.

In order to attain the object explained above, the present invention proposes an alignment method of the opposite layout substrate to realize alignment between two substrates provided opposed with each other, which is characterized in that alignment is performed under the condition that the recessed area is formed at least to one opposing surface of the two substrates.

Moreover, the present invention proposes an alignment device for the opposite layout substrate to perform alignment between two substrates provided opposed with each other, which is characterized by comprising a recessed area forming means to form a recessed area at least to one opposing surface of the two substrates.

In addition, the present invention proposes an LCD consisting of the TFT substrate in which many TFTs are integrated through formation and an opposite layout substrate aligned to such TFT substrate keeping the predetermined gap, which is characterized in that these substrates are aligned under the condition that a recessed area is formed at least to one opposing surface of two substrates.

Thereby, as illustrated in FIG. 3, for example, particles (spacer) arranged between the substrates will never damage the internal surfaces of the substrate even when alignment is performed, because a space may be formed due to formation of the recessed area between two substrates.

BRIEF DESCRIPTION OF THE DRAWINGS

FIG. 1 are diagrams illustrating the stage in the embodiment of the present invention.

FIG. 6A is a plan view and FIG. 6B is a side cross-sectional view.

FIG. 8A is a cross-sectional view and FIG. 8B is an enlarged cross-sectional view.

DESCRIPTION OF THE PREFERRED EMBODIMENTS

Figure 1A:
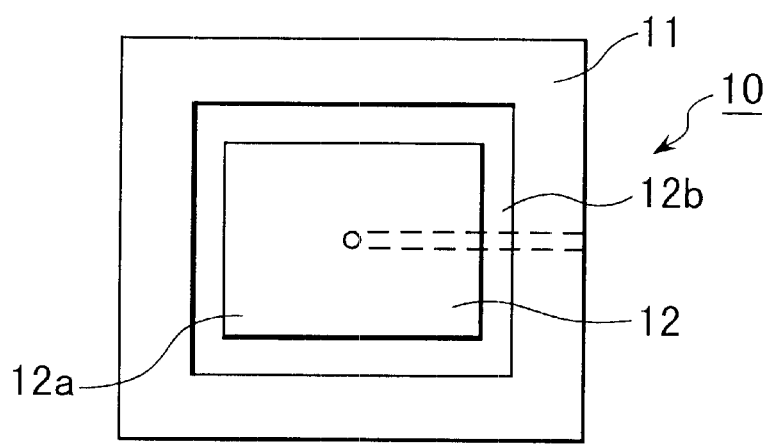
FIG. 1A is a plan view and FIG. 1B is a side cross-sectional view.

The present invention will be explained on the basis of the preferred embodiments of the present invention. The elements explained above are designated by the like reference numerals and the same explanation is not duplicated.

Figure 1B:
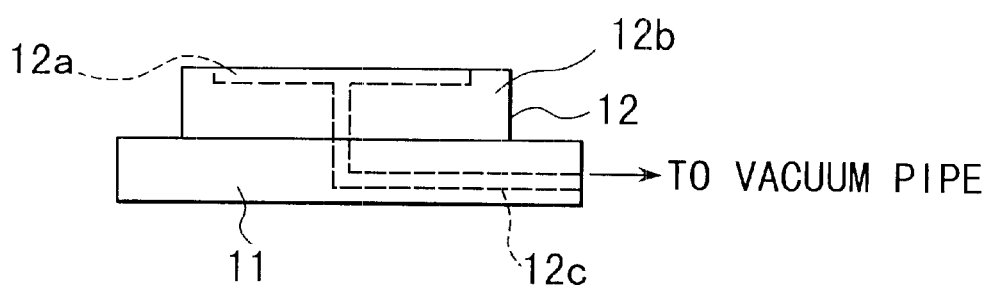
Figure 2:
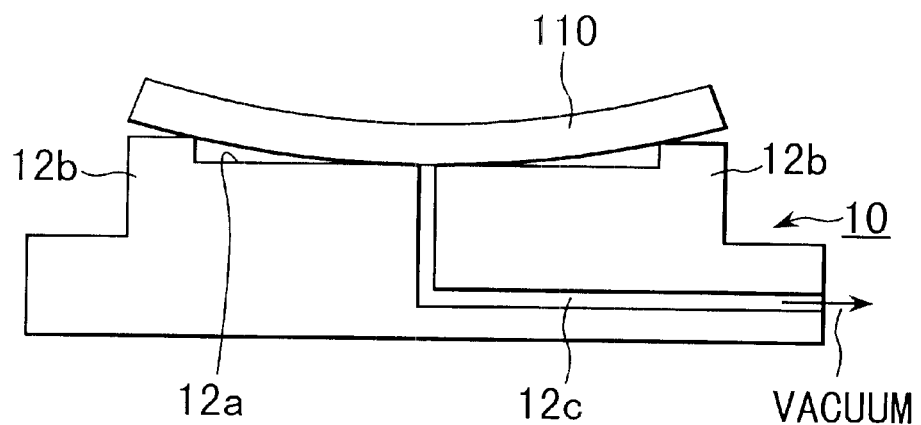
FIG. 2 is a side cross-sectional view when a substrate is set on the stage in the embodiment of the present invention.
Figure 3:
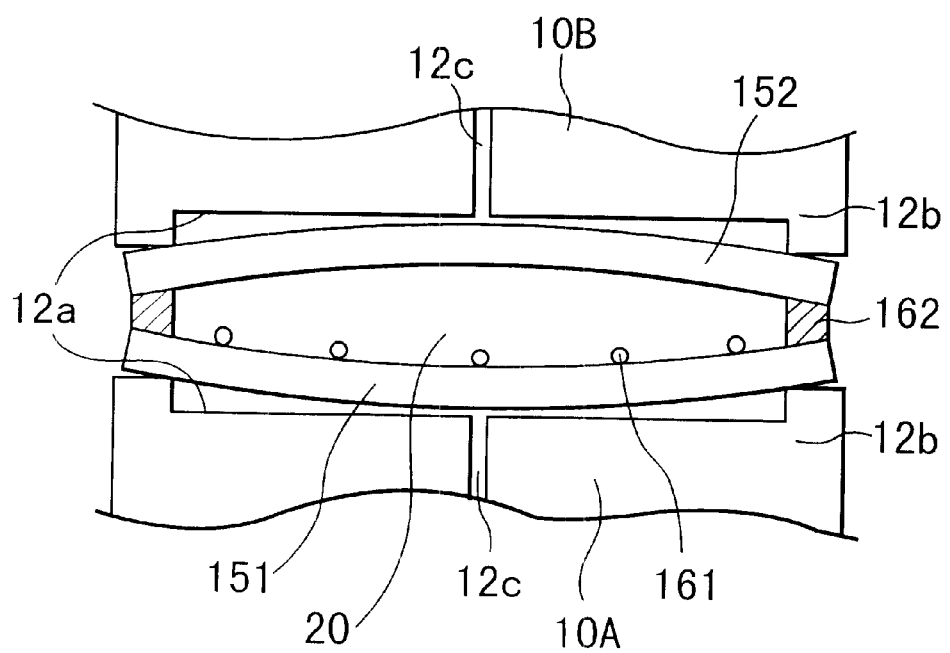
FIG. 3 is a side cross-sectional view illustrating the alignment condition using the stage in the embodiment of the present invention.

FIG. 1A and FIG. 1B are plan view and side cross-sectional view of the stage in the preferred embodiment. FIG. 2 is a side cross-sectional view when the substrate is set on the stage. FIG. 3 is a side cross-sectional view illustrating the condition of alignment in the same stage.

As illustrated in FIG. 1A and FIG. 1B, the stage 10 in the manufacturing apparatus of a liquid crystal display is composed, for example, of a lower rectangular block 11 consisting of stainless steel and an upper rectangular block 12 consisting, for example, of stainless steel which is a littler smaller than the lower block 11. A recessed area 12a is formed at the upper surface of the upper block 12 and a circumference wall area 12b is formed in the periphery. A vacuum-holding hole 12c is bored in the shape of letter T toward the bottom surface from the center of the recessed area 12a and this vacuum-holding hole 12c is connected to a vacuum pipe not illustrated coupled with a vacuum pump for evacuation at 400 mmHg. Any problem is not generated when evacuation is conducted at 500 mmHg or less. A substrate 110 in size of 40 mm square and thickness of 1 mm formed of quartz, for example, is placed on the stage 10 of the structure explained above and it is vacuum-held. Thereby, the substrate 110 is recessed as illustrated in FIG. 2. Here, the ratio of the length between the recessed area 12a and the circumference wall area 12b in the single side is 10:1 and the height of the circumference wall area 12b from the recessed area 12a is 0.05 mm. When the ratio of length between the recessed area 12a and circumference wall area 12b in the single side is 5:1 or more and the height of the circumference wall area 12b from the recessed area 12a is 0.02 mm or more, the substrate is recessed not resulting in any problem. In this case, amount of recess of substrate 110 becomes 10 μm. Finally, when amount of recess of this substrate is three times or more the diameter of spacer, the alignment film is never damaged.

Figure 4:
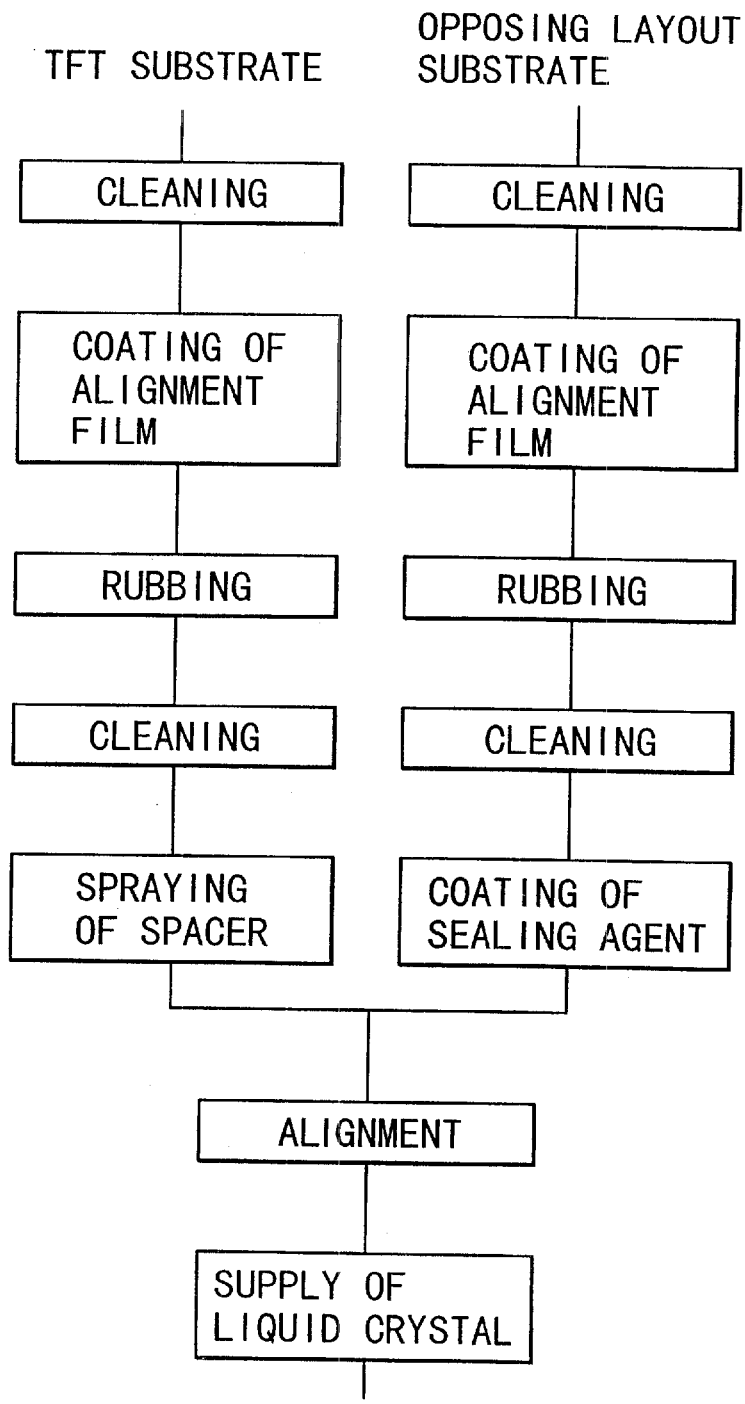
FIG. 4 illustrates a process flow of LCD which is used in the related art and the present invention.
Figure 5:
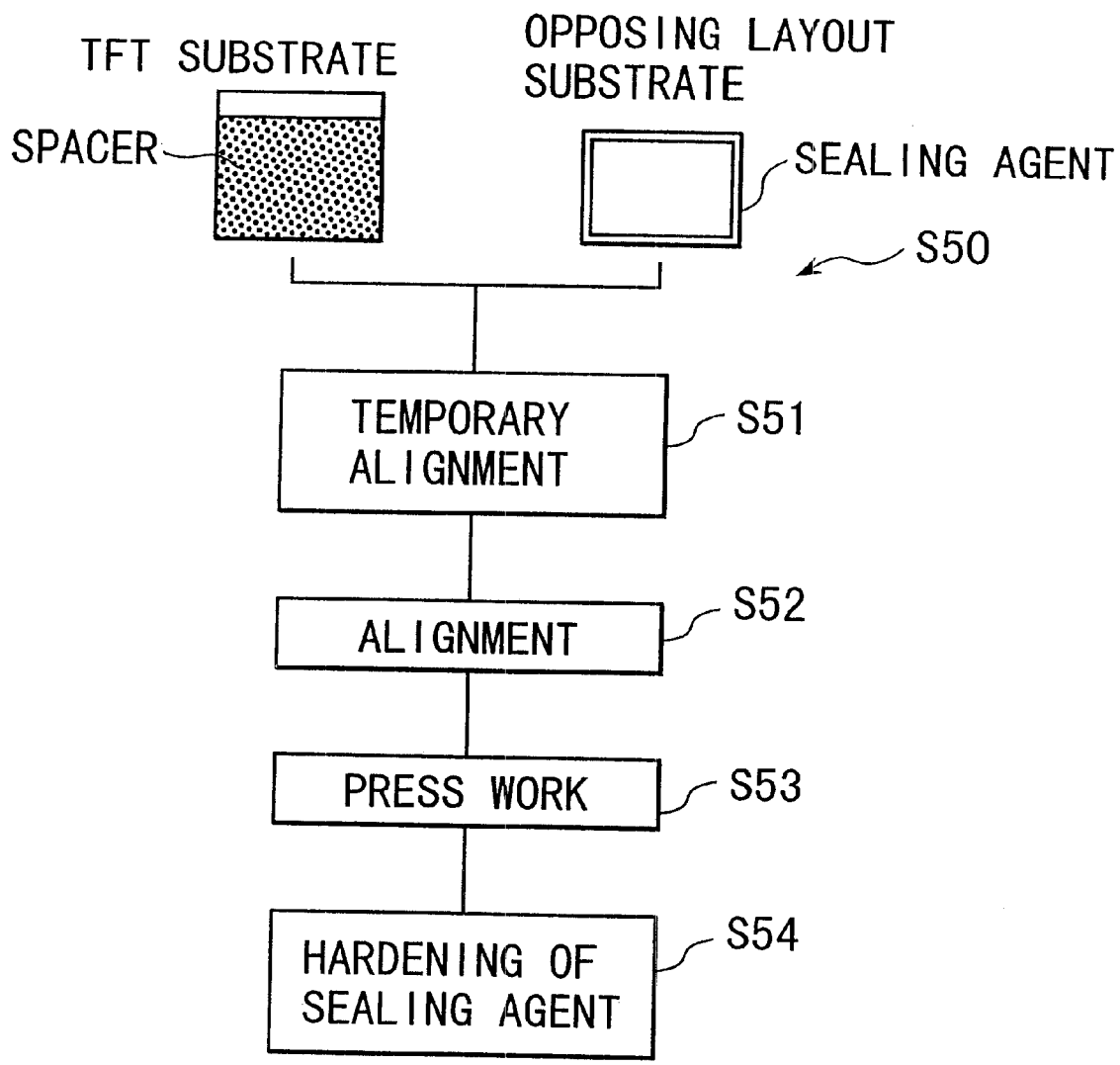
FIG. 5 illustrates a detail flow of the alignment process in the process flow of FIG. 4.
Figure 6A:
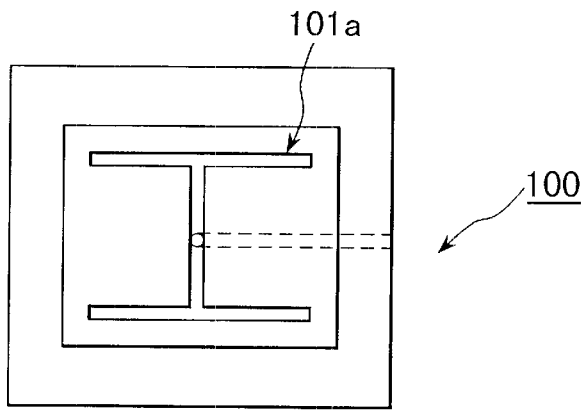
FIGS. 6A and 6B illustrate an example of the stage of the related art.
Figure 6B:
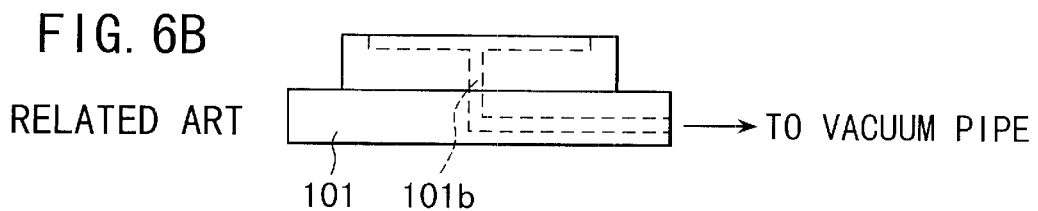
Figure 7:
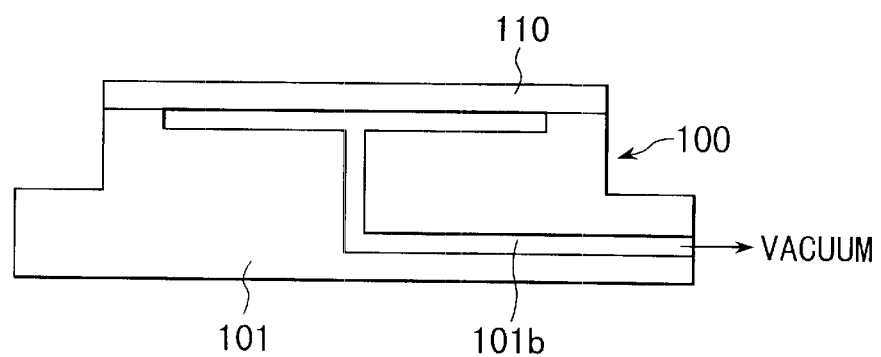
FIG. 7 is a side cross-sectional view when the substrate is set on the stage in the related art.

Next, operation of the preferred embodiment of the present invention will be explained. In the preferred embodiment, the process flow of LCD is identical to that of FIG. 4 and the detail flow of the alignment process in the process flow is also identical to that of FIG. 5. Namely, the operation explained above corresponds to the operation in the alignment process illustrated in FIG. 5.

As is illustrated in FIG. 3, when the TFT substrate 151 which is formed, for example, of quartz to integrate many TFTs is placed on the stage 10A in the TFT substrate side and it is then evacuated, and moreover when the opposite layout substrate 152 formed, for example, of quarts is placed on the stage 10B in the opposite layout substrate side and it is then also evacuated, resulting in the condition that these substrates are placed opposed with each other, respective substrates 151, 152 are vacuum-held toward the stage sides and are then recessed. Therefore, the space area 20 is formed in the opposite layout surface side of substrates and the center areas of substrates become far with each other. Even when the alignment operation is conducted under this condition, the spacer 161 which is formed, for example, of hard resin material in the diameter of 3 μm only operates together with the TFT substrate 151 and is never in contact with the opposite layout substrate 152. As a result, the alignment film is never damaged.

Here, in this embodiment, both substrates are recessed but it is enough, when grain size of spacer is small, that only one substrate is recessed.

Figure 8A:
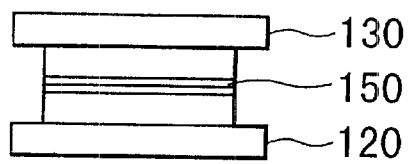
FIGS. 8A and 8B illustrate the condition in the alignment using the stage of the related art.
Figure 8B:
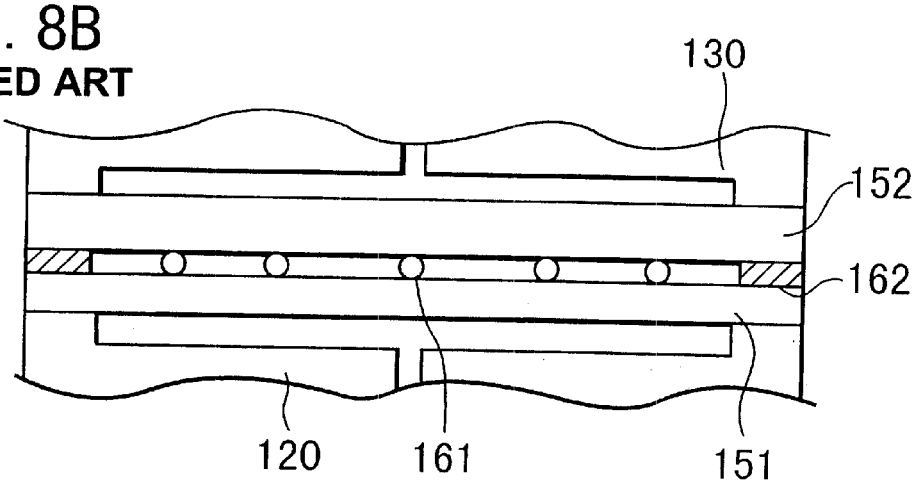

Moreover, according to this embodiment, since the contact area between the stage and substrate is rather reduced in comparison with that of the related art (the surface contact is made in the related art of FIG. 8, while almost the line contact at the center area in this embodiment) probability that a foreign matter (glass chipping or the like) may be held between the stage and substrate can be reduced. As a result, generation of damage caused by holding of a foreign matter can be suppressed.

In addition, in regard to the present embodiment, alignment of substrates in the TFT type liquid crystal display is explained, but it is of course possible that the present invention can also be adapted to any type of alignment of two substrates through provision of particle material.

As explained above, according to the present invention, since the recessed area may be formed at the opposing surfaces of two opposite layout substrates, the apparatus combining two substrates (for example, LCD) can be manufactured only with a kind of spacer without generation of damage on the internal surface (alignment film). Moreover, the process for spraying the spacer of large grain size for preventing generation of damage on the alignment film which has been introduced in the related art can be eliminated in the present embodiment and therefore the present invention makes, for example, much contribution to reduction in cost of LCD.

What is claimed is:

1. An alignment method of an opposite layout substrate for the alignment between two substrates provided opposed with each other, wherein a recessed area having a rectangular outline is formed to at least one opposing surface of said two substrates, a ratio of a length of the recessed area to a cross-sectional width of a non-recessed area of the surface being at least 5:1.

2. An alignment method of an opposing layout substrate as claimed in claim 1, wherein a particle material is provided between said two substrates.

3. An alignment method of an opposing layout substrate as claimed in claim 1 or 2, wherein said two substrates provided opposed with each other are a TFT substrate and an opposing layout substrate.

4. An alignment device of an opposite layout substrate for alignment between two substrates provided opposed with each other, wherein said alignment device comprises a recessed area forming means provided to form a recessed area having a rectangular outline at least for any one surface of the opposing surfaces of said two substrates, a ratio of a length of the recessed area to a cross-sectional width of a non-recessed area of the surface being at least 5:1.

5. An alignment method of an opposing layout substrate as claimed in claim 4, wherein a particle material is provided between said two substrates.

6. An alignment device of an opposing layout substrate claimed in claim 4, wherein said recessed area forming means forms a circumference wall area in the periphery and also forms a recessed area at the center area and said recessed area is provided with a vacuum holding hole.

7. An alignment device of an opposing layout substrate as claimed in any one of claims 4 to 6, wherein said two substrates provided opposed with each other are a TFT substrate and an opposing layout substrate.

8. A liquid crystal display (LCD) of the following structure, comprising:

a TFT substrate on which many TFTs are integrated; and an opposing layout substrate aligned to said TFT substrate via a predetermined gap, wherein at least one opposing surface of the TFT substrate and the opposing layout substrate is aligned under a condition that a recessed area having a rectangular outline is formed therefor, a ratio of a length of the recessed area to a cross-sectional width of a non-recessed area of the surface being at least 5:1.

9. A liquid crystal display as claimed in claim 8, wherein said predetermined gap is defined by providing particle material between said two substrates.

* * * * *